J. A. SPROTT.
PLOW GAGE.
APPLICATION FILED OCT. 16, 1916.

1,279,031.

Patented Sept. 17, 1918.

WITNESSES
W. C. Fielding
Wm. H. Mulligan

INVENTOR
Julius A. Sprott
BY Richard B. Owen
ATTORNEY

UNITED STATES PATENT OFFICE.

JULIUS A. SPROTT, OF GREENWOOD, SOUTH CAROLINA.

PLOW-GAGE.

1,279,031. Specification of Letters Patent. Patented Sept. 17, 1918.

Application filed October 16, 1916. Serial No. 125,985.

*To all whom it may concern:*

Be it known that I, JULIUS A. SPROTT, a citizen of the United States, residing at Greenwood, in the county of Greenwood and State of South Carolina, have invented certain new and useful Improvements in Plow-Gages, of which the following is a specification.

This invention relates to a plow gage and the primary object of the invention is to provide a means adapted to be carried by a plow beam and arranged to gage the distance between the furrows made by the plow.

Another object of the invention is to provide a gage having an extension from which depends a drag link the end of which is adapted to lie in and travel along the adjacent furrow when the plow is forming the next furrow so that the distance between the furrows may be the same for their entire length.

Another object of the invention is to provide a gage of this character which may be adjusted for regulating the distance between the furrows spaced at any preferred distance so that furrows may be formed for different kinds of cultivation.

As a further object of the invention the gage is pivotally mounted so that it may be swung from one side of the plow to the other for gaging the distance between the furrows from either side of the plow.

A further object of this invention is the provision of a plow gage which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
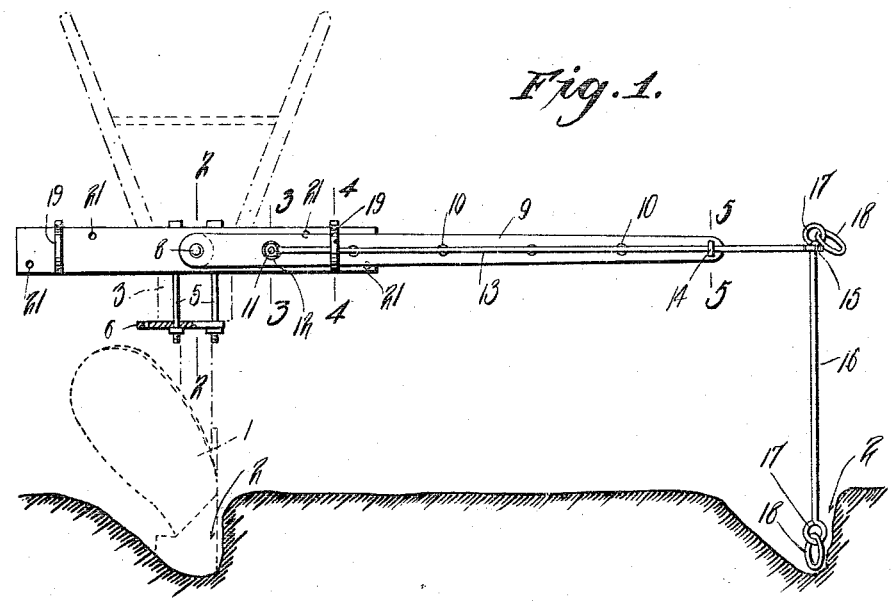
Figure 1 is a front elevation of a plow gage showing the same applied to a plow, the latter being illustrated in dotted lines.
Figure 2:
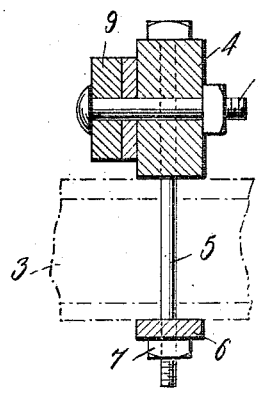
Fig. 2 is a section on the line 2—2 of Fig. 1.
Figure 3:
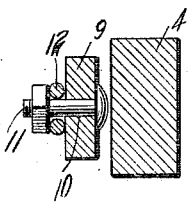
Fig. 3 is a section on the line 3—3 of Fig. 1.

Referring to the drawing, wherein is illustrated the preferred form of my invention, and in which like numerals of reference indicate corresponding parts throughout the several views, the plow 1 shown by dotted lines in Fig. 1 is employed in the usual manner for forming the furrows 2. The plow beam 3, also shown in dotted lines, carries a retaining bar 4 which extends transversely across the top of the plow beam and is fastened to the plow beam by the bolts 5 the lower ends of which are projected through apertures in a clamp plate 6. This clamp plate contacts with the lower surface of the plow beam and is held to the plow beam by the nuts 7 mounted upon the screw threaded ends of the bolts 5. This plate 6 is slightly elongated and has an aperture at its extended end, as shown by Fig. 1 of the drawing, so that the bolts 5 may be arranged on opposite sides of the plow beam and extended through the apertures in the ends of the plate 6 if such construction is desired.

Figure 5:
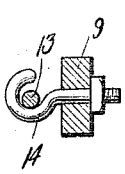
Fig. 5 is a section on the line 5—5 of Fig. 1.

Extended through the center of the retaining bar 4 is a pivot bolt 8 and pivotally mounted upon the pivot bolt is a supporting arm 9 provided with a plurality of longitudinally spaced openings 10. A bolt 11 is extended through the center of the apertures and is adapted to receive a loop 12 formed on the end of an extension rod 13 which is normally disposed at the front of the arm 9 and has its opposite end projected beyond the end of the arm 9. As shown by Fig. 5 of the drawing the end of the arm 9 carries a hook 14 in which rests the rod 13 so that the rod is supported in longitudinal alinement with the arm 9. An eye 15 is formed at the free end of the rod 13 and extended through the eye is a drag link 16 each end of which is provided with a loop 17 for receiving a ring 18.

Figure 4:
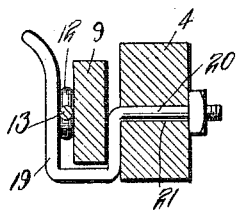
Fig. 4 is a section on the line 4—4 of Fig. 1.

In order that the arm 9 may be extended outwardly at the proper height from the ground surface, I have provided a yoke 19 having one end provided with an extension to provide a fastening element 20 which is extended through one of a plurality of apertures 21 formed in each end of the retaining bar 4. The arm 9 is adapted to rest within the yoke as clearly shown by Fig. 4 of the drawing, and the angular disposition of the arm 9 is governed by changing the bolts 20 to any one of the holes 21 at each end of the retaining bar 4. The holes 21 as shown to advantage in Fig. 1 of the drawing, are spaced obliquely to facilitate the angular adjustment of the arm 9. One of the yokes 19 is disposed at each end of the retaining bar 4 so that the extension arm 9 may be swung to either side and be retained in position by the yoke. It will be understood of course, that the holes 10 may be arranged closer together for providing a finer adjustment of the distance between the furrows. For changing the distance it is merely necessary to remove the bolt 11 and place it in another one of the holes 10 thus changing the distance between the drag link 16 and the plow 1.

In operation, the operator will place the plow in position so that the drag link is disposed in the adjacent furrow. The plow is then started and during the course of the plowing operation, the drag link is made to keep its course in the adjacent furrow and the new furrow is thereby formed at a distance from the adjacent furrow that will be equal for the entire length of the furrows.

From the foregoing it will be observed that a very simple and durable plow gage has been provided, the details of which embody the preferred form. I desire it to be understood however, that slight changes in the minor details of construction may be made without departing from the spirit of the invention or the scope of the claim hereunto appended.

I claim:

A plow gage comprising a plow having a plow beam provided with a retaining bar projecting from each side of the said beam, each end of the said retaining bar having obliquely spaced apart openings, retaining yokes, each having a fastening element adapted for reception in any of the said openings at each end of the bar whereby the said bar may be adjusted angularly by changing the position of one of the yokes from one opening to another, a supporting bar pivotally connected to the retaining arm and adapted to be retained in either of the said yokes and provided with longitudinally spaced apart openings, a hook carried by the end of the said supporting bar, and adjustably mounted means carried by the supporting arm and adapted for longitudinal adjustment in the said hook, the said means including a movable element adapted for reception in any of the longitudinally spaced openings in the supporting bar.

In testimony whereof I affix my signature in presence of two witnesses.

JULIUS A. SPROTT.

Witnesses:
J. T. CALHOUN,
J. A. CALHOUN.

Copies of this patent may be obtained for five cents each, by addressing the "Commissioner of Patents, Washington, D. C."